A. JACKSON.
Thrashing Machine.
No. 21,963.
2 Sheets—Sheet 1.
Patented Nov. 2, 1858.
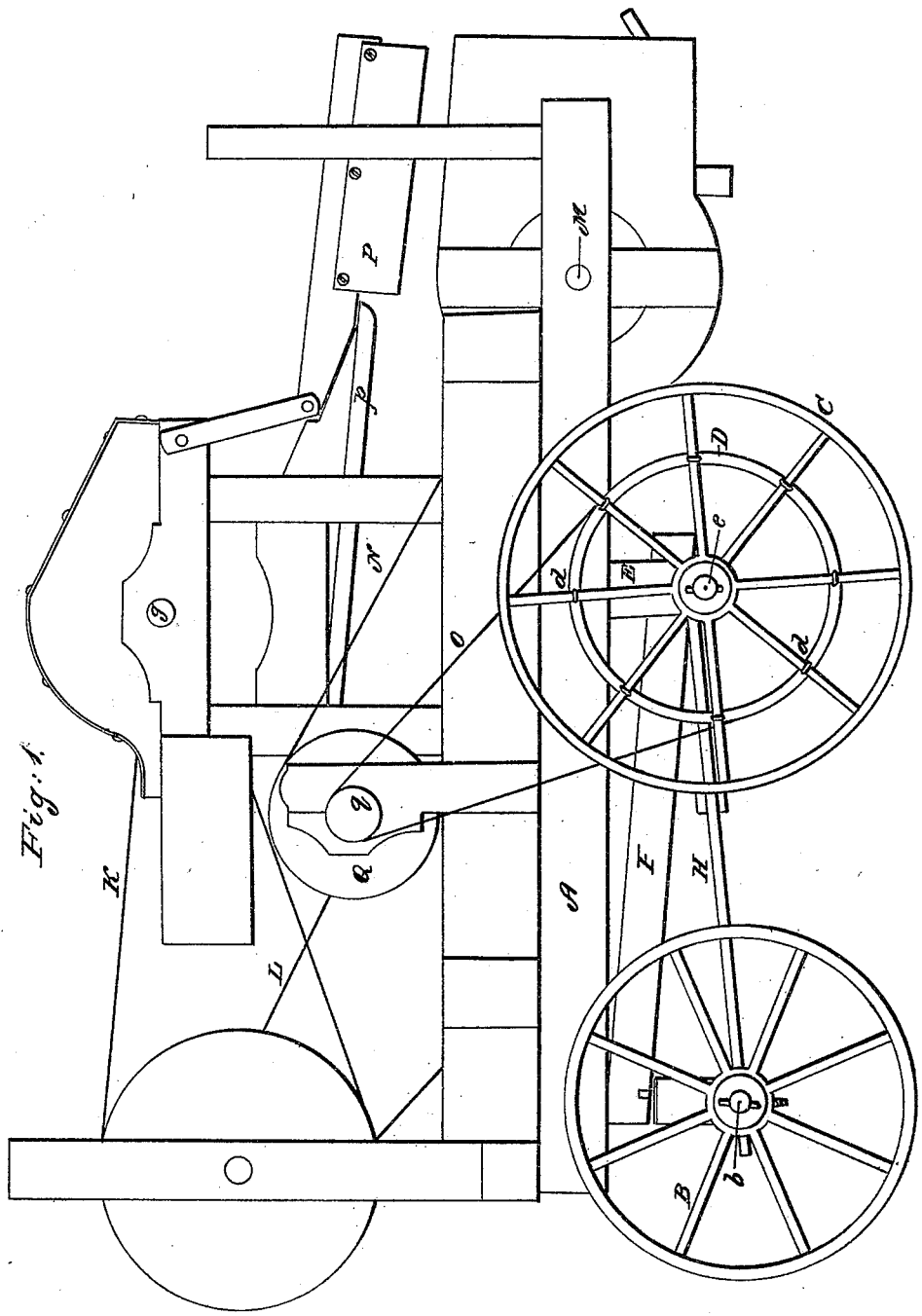

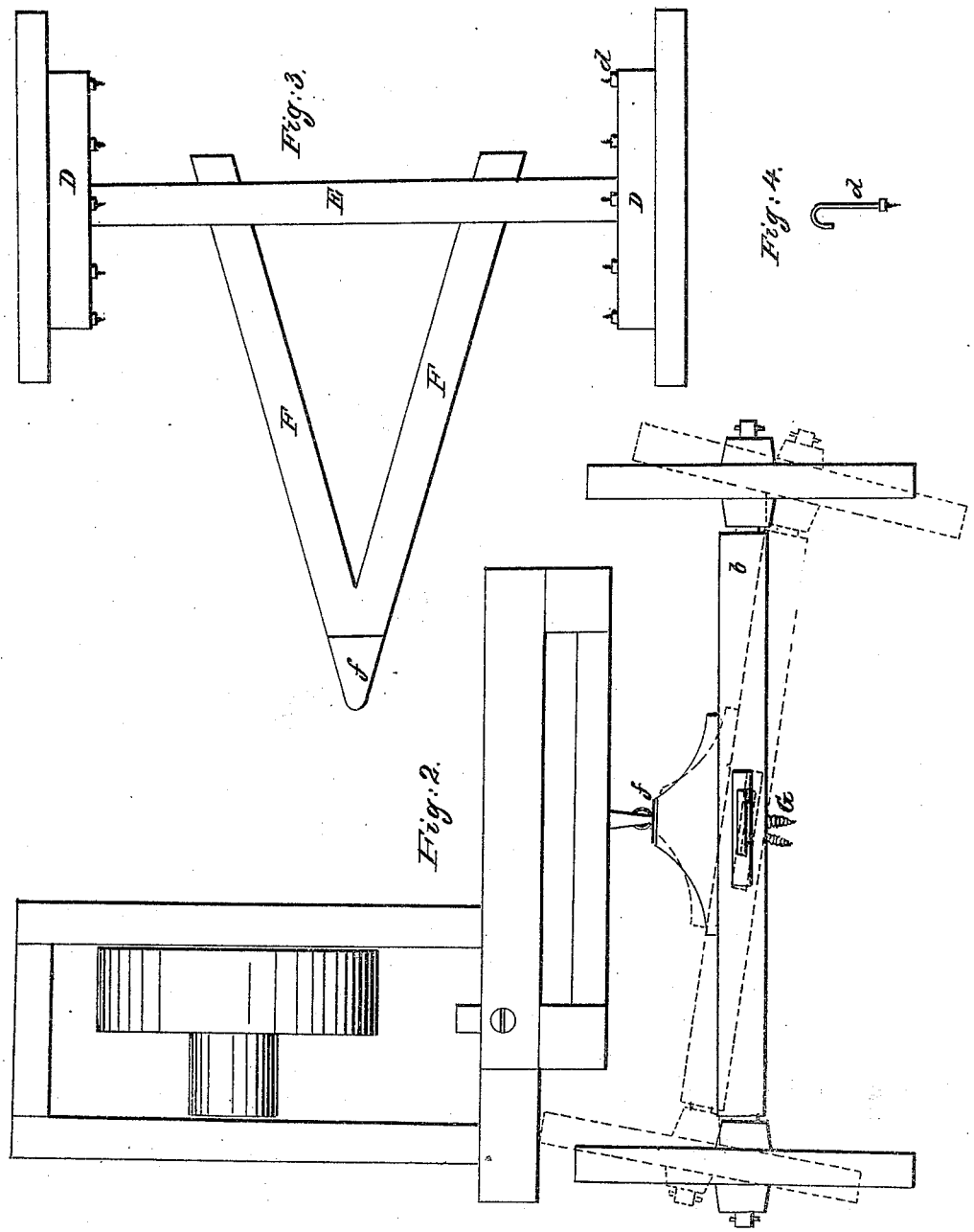

UNITED STATES PATENT OFFICE.

ABRAM JACKSON, OF LEBANON, TENNESSEE.

THRESHING-MACHINE.

Specification of Letters Patent No. 21,963, dated November 2, 1858.

*To all whom it may concern:*

Be it known that I, ABRAM JACKSON, of Lebanon, in the county of Wilson and State of Tennessee, have invented a new and Improved Traveling Wheat-Thresher; and I do hereby declare that the following is a full and exact description thereof, reference being had to the accompanying drawing and to the letters of reference marked thereon.

In the accompanying drawings, Figure 1, is a side view of my thresher and winnower, together with the wagon wheels which serve as the driving power to the other machinery. Fig. 2, is a view of the forward end of my machine. Figs. 3, and 4, are views of detached parts.

My improvement relates to traveling threshers and winnowers, and is intended to be employed with a common farm wagon, thus saving the expense of a separate power, or of the wheels and axles commonly sold with similar machines.

My invention consists in the mode of gearing or attaching the thresher and winnower to the wagon and also in the mode of supporting the frame of the former upon the axles of the wagon which forms the driving power.

In Fig. 1, any suitable frame A is supported in a manner hereinafter to be described, upon the wheels B, C, and the axles *b, c*. Upon this frame A are mounted the thresher and the winnower, as seen in Fig. 1, where I is the threshing cylinder, operated by the bands, K, and L, the latter of which passes around a band-wheel attached to one of the hind traveling wheels yet to be described. In the same figure, M, is the axle of the winnower, which is set in motion by the bands N, O, the latter passing around the band wheel D.

The frame P, of the separator and screen is shaken in the usual way by a connecting rod *p*, by means of a crank or eccentric operated by the axle Q.

Upon each hind wheel is fastened a band wheel D, by means of hooks *d*, (seen detached in Fig 4,) which pass completely through the band wheels and around the spokes. These band wheels may be made of wood or of metal. I prefer the former on account of cheapness and lightness. The hooks are provided with a screw nut to hold them in place, and it is better to allow the point of the hook to enter a blind-hole in the band wheel before being brought home upon the spokes. This arrangement of band wheels can be applied to any common farm wagon, and thus save the expense of a separate power or driving gear.

One great advantage of the bands is their elasticity, which obviates the difficulty arising from the ungearing or cramping of cogs by the passing of the wagon over uneven ground.

The frame of the machine rests upon a bolster, E, and a pair of hounds F, which brace the frame strongly, and prevent it twisting as the traveling wheels pass over stones or other obstacles. The forward ends of these hounds are rounded on the under side and guarded by a plate, *f*. They rest loosely upon the forward axle, above the head of the king-bolt G, which holds the coupling bar H. By this arrangement the forward axle is free to rock, as seen in Fig. 2, without warping the frame or disturbing the bands or other parts of the machinery.

I am aware that threshers and winnowers have been mounted upon wheels like those of a common wagon, the traveling wheels operating as driving wheels to the other machinery. In such cases the wheels are usually made and sold as part of the thresher and winnower. I believe no thresher and winnower has been heretofore constructed so as to be readily used upon a common farm wagon.

I do not broadly claim the mechanical devices above described, but limit myself to their new results, as contributing to make substantial improvements in harvesters.

Having thus fully described my invention, what I claim and desire to secure by Letters Patent of the United States is:

The arrangement of the band wheels D, upon the spokes of the wagon wheels, in connection with the hounds F, substantially as described for the purposes set forth.

ABRAM JACKSON.

Witnesses:
Daniel Breed,
Edw. F. Brown.